US007606795B2

(12) United States Patent
Hsu et al.

(10) Patent No.: US 7,606,795 B2
(45) Date of Patent: Oct. 20, 2009

(54) SYSTEM AND METHOD FOR VERIFYING THE INTEGRITY AND COMPLETENESS OF RECORDS

(75) Inventors: Windsor Wee Sun Hsu, San Jose, CA (US); Xiaonan Ma, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 11/672,831

(22) Filed: Feb. 8, 2007

(65) Prior Publication Data

US 2008/0195583 A1 Aug. 14, 2008

(51) Int. Cl.
*G06F 17/30* (2006.01)
(52) U.S. Cl. .................. 707/3; 707/4; 707/5; 713/178; 715/255; 715/272
(58) Field of Classification Search ........................ None
See application file for complete search history.

(56) References Cited

U.S. PATENT DOCUMENTS

| | | | | |
|---|---|---|---|---|
| 5,136,647 | A * | 8/1992 | Haber et al. | ................. 713/178 |
| 6,021,491 | A | 2/2000 | Renaud | |
| 6,976,165 | B1 | 12/2005 | Carpentier et al. | |
| 7,096,493 | B1 | 8/2006 | Liu | |
| 2004/0039917 | A1* | 2/2004 | Ross | ........................... 713/179 |
| 2005/0273592 | A1 | 12/2005 | Pryor et al. | |
| 2006/0112096 | A1 | 5/2006 | Ahluwalia et al. | |
| 2006/0206669 | A1 | 9/2006 | Zhu et al. | |
| 2006/0248052 | A1* | 11/2006 | Zurek | ............................. 707/3 |
| 2006/0259459 | A1* | 11/2006 | Wu et al. | ........................ 707/2 |
| 2007/0028307 | A1* | 2/2007 | Murison et al. | ............... 726/27 |

OTHER PUBLICATIONS

Verifying Completeness of Relational Query Results in Data Publishing, SIGMOD Jun. 14-15, 2006, Pang et al.*
Verified query results from hybrid authentication tress, Glen et al, Data and application security 2005, LNCS 3654, pp. 84-98, 2005.*
Authenticating query results in edge computing, Pang et al, proceedings of the 20th international conference on data engineering (ICDE'04).*
An approach to ensure integrity of outsourced databases using signature aggregation and chaining, Narasimha et al, school of information and computer science, University of California (2005).*

(Continued)

*Primary Examiner*—Pierre M Vital
*Assistant Examiner*—Augustine Obisesan
(74) *Attorney, Agent, or Firm*—Shimokaji & Associates, P.C.; Samuel A. Kassatly

(57) ABSTRACT

A correctness verification system receives a query, executes the query using a query logic, and produces a query result. The query result comprises data records that satisfy the query, data verification objects associated with the data records, index segments accessed during the execution of the query, index verification objects associated with the index segments, and the query. The system transfers the query result to a verification system. The verification system verifies correctness of the query result by executing the query using the query logic. The verification system uses the data verification objects to verify integrity of the data objects, uses the index verification objects to verify the integrity of the index segments, and uses the index verification objects and the data verification objects to verify the completeness of the query result.

3 Claims, 10 Drawing Sheets

OTHER PUBLICATIONS

Authentic third-party data publication, Devanbu et al, department of computer science, University of California (1999).*

Stein, C.A. et al., "Unifying File System Protection", Jun. 2000, Proceedings of the 2001 USENIX Annual Technical Conference, pp. 79-90.

Ashar, S.M. et al., "Message Encryption With Image Processing", Dec. 2003, Proceedings INMIC 2003, 7th International Multi-Topic Conference, pp. 7-15.

Mahimkar, A. et al., "SECUREDAV: A Secure Data Aggregation and Verification Protocol for Sensor Networks", Dec. 2004, Globecom '04 IEEE Global Telecommunications Conference, vol. 4, pp. 2175-2179.

Liophanich, C., "An Automatic E-Evidence Archival System", Aug. 2005, 2005, 3rd IEEE International Conference on Industrial Informatics (INDIN), pp. 209-214.

* cited by examiner

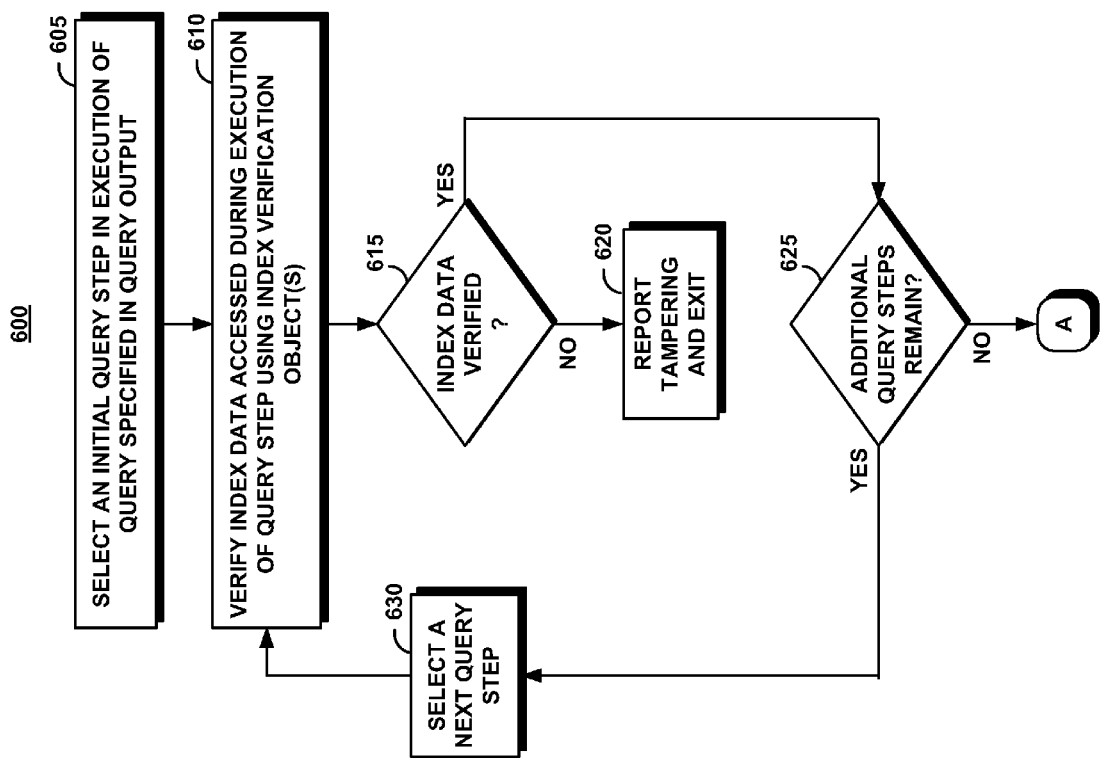

SYSTEM AND METHOD FOR VERIFYING THE INTEGRITY AND COMPLETENESS OF RECORDS

FIELD OF THE INVENTION

The present invention generally relates to preserving and verifying the trustworthiness of data records and metadata structures. In particular, the present invention preserves the integrity and completeness of dynamic metadata structures and provides efficient verification of query results over such metadata structures.

BACKGROUND OF THE INVENTION

The fundamental purpose of record keeping is to establish irrefutable proof and accurate details of events that have occurred. However, critical records, such as business communications, financial statements, and medical images, are increasingly stored in electronic form, which makes them relatively easy to clandestinely destroy or modify. The threat of intentional and inside attacks is very real, given the extremely high stakes that may be involved in tampering with the records. With recent corporate misconduct and the ensuing attempts to change history, a growing fraction of records is now subject to regulations (e.g., Sarbanes-Oxley Act, SEC Rule 17a-3/4, HIPPA, DOD 5015.2) regarding records maintenance.

To protect data records from tampering, the current industry practice and regulatory requirements (e.g. SEC Rule 17a-4) rely on storing records in write-once read-many (WORM) storage for preservation. Conventional solutions have focused on protecting the integrity of individual data records. However, given the large amount of data stored in current electronic record repositories, it is not practical to scan through all data when a portion of the data records requires retrieval. Instead, data are often accessed through some type of metadata structure. Examples of such metadata structures include directories in a file system or search indexes created by a search engine.

Protecting such metadata structures is at least as important as protecting the data records. Even if all data records are stored on WORM storage and protected from malicious altering, a tampered index can still hide an existing data record. Hiding an existing data record effectively "erases" the data record by rendering it inaccessible in an efficient manner or within a reasonable amount of time. Similarly, a tampered index may point to a different data record than the correct one, effectively "replacing" the original data record.

While data records covered by regulations are generally fixed-content data, the metadata structures for indexing the data records are dynamic data structures that are updated as new data records are added into the system or expired data records are purged. Conventional approaches for generating such dynamic data structures typically require rewritable storage, which leads to greater risk of tampering. Recently there has been research on index structures that do not require rewritable storage. Such an index grows in an append-only fashion without overwriting any previously written data and therefore can also be stored on WORM storage.

Although this technology has proven to be useful, it would be desirable to present additional improvements. Conventional WORM solutions fall short when data needs to be extracted out of the trusted WORM device. The WORM storage prevents overwrites to data only as long as the data is stored inside the WORM system. However, unless the user requesting the data has direct access to the WORM system, the retrieved data could be tampered during data transfer. This could happen, for example, when a query result is transferred from the data repository received the query to the user initiated the query, or, when data records and metadata structures are migrated from a source system to a target system. Even if the target system is also a WORM system, data is still vulnerable during the migration process such as when data is being transferred through a network.

Standard approaches for protecting data over untrusted communication channels such as encryption are inadequate given the high likelihood of insider attacks. Since the owners of the data records and the system are often the same group of people who may benefit from tampering with the data, an insider adversary in this case often has the highest (executive) level of support and insider access, privilege, and knowledge. The adversary cannot destroy records in a blatant fashion (for example, by physically destroying the storage devices), as such destruction is easy to detect and may lead to severe penalties and a presumption of guilt. However, the adversary may initiate a spurious migration of data records and attempt to modify selected records during the migration process.

Some existing WORM solutions produce a one-way hash for each data record based on the content of the data record and use the one-way hash as the record identifier. Such a hash value, sometimes called the content address of the data record, can be used to verify whether the content of the data record has been modified.

Although this approach has proven to be useful, it would be desirable to present additional improvements. A content address merely provides a way to verify whether the content of the data record matches with the content address. However, the content address tells nothing about whether such a data record actually exists within a particular system.

Furthermore, the content addresses are themselves part of the metadata that need to be protected from tampering. Content addresses stored on WORM storage are exposed to the same level of risk as the rest of the data during the migration process. Content addresses stored outside the WORM storage require additional mechanisms to protect the content addresses.

Computing a content address to verify the content of a corresponding data record requires accessing all the content of the data record. This is generally not an issue for data records since each data record is typically accessed as a whole. However, metadata structures such as indexes are constructed in such ways that a query execution only needs to access a small fraction of all the data in an index. Accessing all the data in the index to compute a content address to verify the integrity of the index results in unacceptable performance and defeats the purpose of having an index.

Unlike data records comprising content that is fixed after creation, metadata structures such as indexes are updated frequently. Consequently, either the content address of the index is computed immediately before a data migration or the content address is updated as the index is being built. Computing the content address of the index immediately before a data migration exposes the index to tampering while the index is being build.

What is therefore needed is a system, a service, a computer program product, and an associated method for verifying the integrity and completeness of records that preserves the trustworthiness of both data records and metadata structures, in particular, across data migrations. Such a system and method should also provide efficient verification of the correctness of query results. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for verifying the integrity and completeness of query results.

The present system receives a query, executes the query using a query logic, and produces a query output. The query output comprises data records that satisfy the query, data verification objects associated with the data records, index segments accessed during the execution of the query, index verification objects associated with the index segments, and the query. The present system transfers the query output to a verification system. The verification system verifies correctness of the query result by executing the query using an equivalent query logic. The verification system uses the data verification objects to verify integrity of the data objects, uses the index verification objects to verify the integrity of the index segments, which, in turn are used to verify the completeness of the query result.

The present system may be embodied in a utility program such as a data retrieval and verification utility program. The present system also provides a method for the user to identify a query output comprising a query, data records satisfying the query, data verification objects associated with the data records, index segments accessed by the query, and index verification objects associated with the accessed index segments. The user invokes the correctness verification utility program to verify the correctness of the query result. Verifying the correctness of the query result verifies the integrity of the query result (verifying that each of the data records in the query result are unaltered) and verifies the completeness of the query result (verifying that the query result comprises all the data records and only the data records that meet the query criteria).

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Index: a metadata structure for efficient locating and accessing of data records. Examples of index include file system directory structures, search engine indexes, database tables and schemas, and so on.

Index page (interchangeably referred to herein as index segments or metadata structure segments): a segment of an index that is often accessed as a single unit by a query system. The size of an index page can be much smaller than the size of the whole index.

Query: a data retrieval request to a data repository requesting data records satisfying certain query criteria. Examples of queries include file lookups in a file system, a search request asking for documents containing certain keywords, database queries, and so on.

Query result: selected data records returned by a data repository in response to a query.

Query output: a query result with associated verification information for verifying the correctness of the query result Integrity: unaltered or untampered, with no unauthorized modifications. A query result that meets the integrity criteria comprises data records that each meets the integrity criteria; i.e., each of the data records in the query result has not experienced tampering.

Completeness: without additions to or omissions from an identified set such as a query result. A query result meeting the completeness criteria comprises all the data records and only the data records that meet the query criteria.

Correctness: comprising both integrity and completeness.

Merkle Tree: A tree of hashes. As used by the present invention, the leaves in the Merkle tree are secure hashes of metadata pages or index segments, and nodes further up in the tree are secure hashes of their respective children.

Trusted Domain: a tamper-resistant secure sub-system. Examples of a trusted domain comprise a secure co-processor or a WORM storage system.

Figure 1:
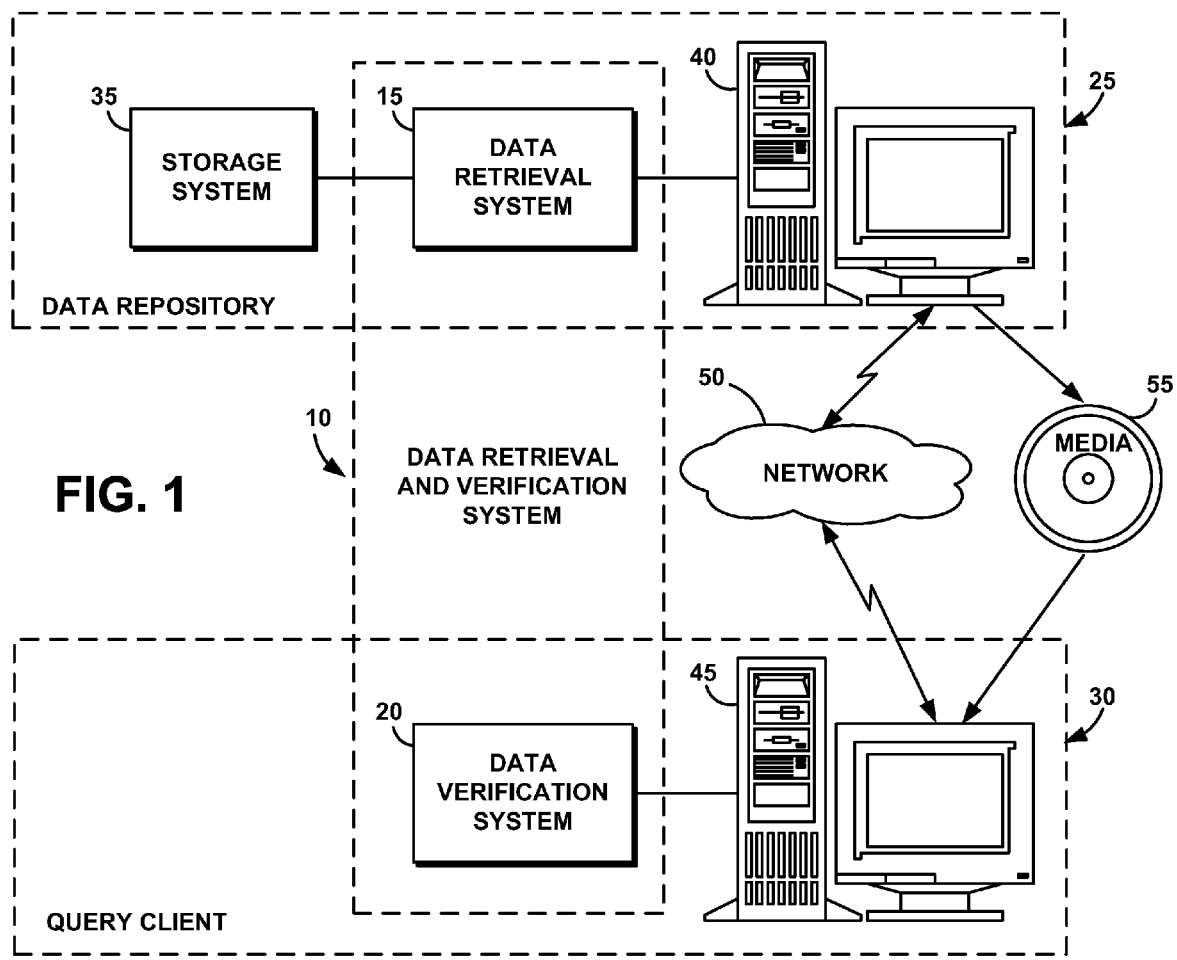
FIG. 1 is a schematic illustration of an exemplary operating environment in which a data retrieval and verification system of the present invention can be used.

FIG. 1 portrays an exemplary overall environment in which a system, a service, a computer program product, and an associated method (the data retrieval and verification system 10 or the "system 10") for verifying the correctness of records according to the present invention may be used. System 10 comprises a software programming code or a computer program product that is typically embedded within, or installed on a computer or secure co-processor. Alternatively, system 10 can be saved on a suitable storage medium such as a diskette, a CD, a hard drive, or like devices.

System 10 can take the form of an entirely hardware embodiment, an entirely software embodiment or an embodiment containing both hardware and software elements. In one embodiment, system 10 is implemented in software, which includes but is not limited to firmware, resident software, microcode, etc.

Furthermore, system 10 can take the form of a computer program product accessible from a computer-usable or computer-readable medium providing program code for use by or in connection with a computer or any instruction execution system. The computer program product comprises the instructions that implement a method of system 10. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W), and DVD.

A data processing system suitable for storing and/or executing program code comprises at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

System 10 comprises a data retrieval system 15 and a data verification system 20. The data retrieval system 15 resides in a data repository system 25 (interchangeably referred to herein as the data repository 25) and the data verification system 20 resides in a query client system 30 (interchangeably referred to herein as the query client 30). The data repository 25 comprises the data retrieval system 15, a storage system 35, and a computer 40. The query client 30 comprises the data verification system 20 and a computer 45. The query client 30 retrieves data from the data repository 25 by sending data requests to the data repository 25. A data request may contain one or more parameters specifying which data to be retrieved.

Handling of a data request may require operations on some metadata structure such a file system or a search index. Such a metadata structure operation typically only accesses a small subset of the content of the metadata structure. For example, a search operation performed on a search index normally accesses a small fraction of the index based on the indexing logic and returns a list of data records that meets the search criteria. Without loss of generality, such a metadata structure is referred to herein as an index, such a data request is referred to herein as a query, and the result produced by such an operation is referred to herein as a query result.

In response to a query from the query client 30, the data retrieval system 15 retrieves data from the storage system 35 and returns the query result to the query client 30. The correctness of the result of the query (i.e., the query result) can be verified by the data verification system 20 in the query client 30. Verifying the correctness of the query result comprises verifying the completeness of the data, i.e., verifying that all of the data that meets the query criteria are found and returned to system 30 and that data has not been omitted. Verifying correctness of the query result further comprises verifying the integrity of the query result, i.e., verifying that the returned data have not been tampered with or their original form or content has not been altered.

The protected data may be migrated from the data repository 25 to the query client 30 by any transfer or migration method. Exemplary methods of transfer shown in FIG. 1 comprise transfer via a network 50 or via a media 55 such as, for example, disk, flash drive, etc.

Figure 2:
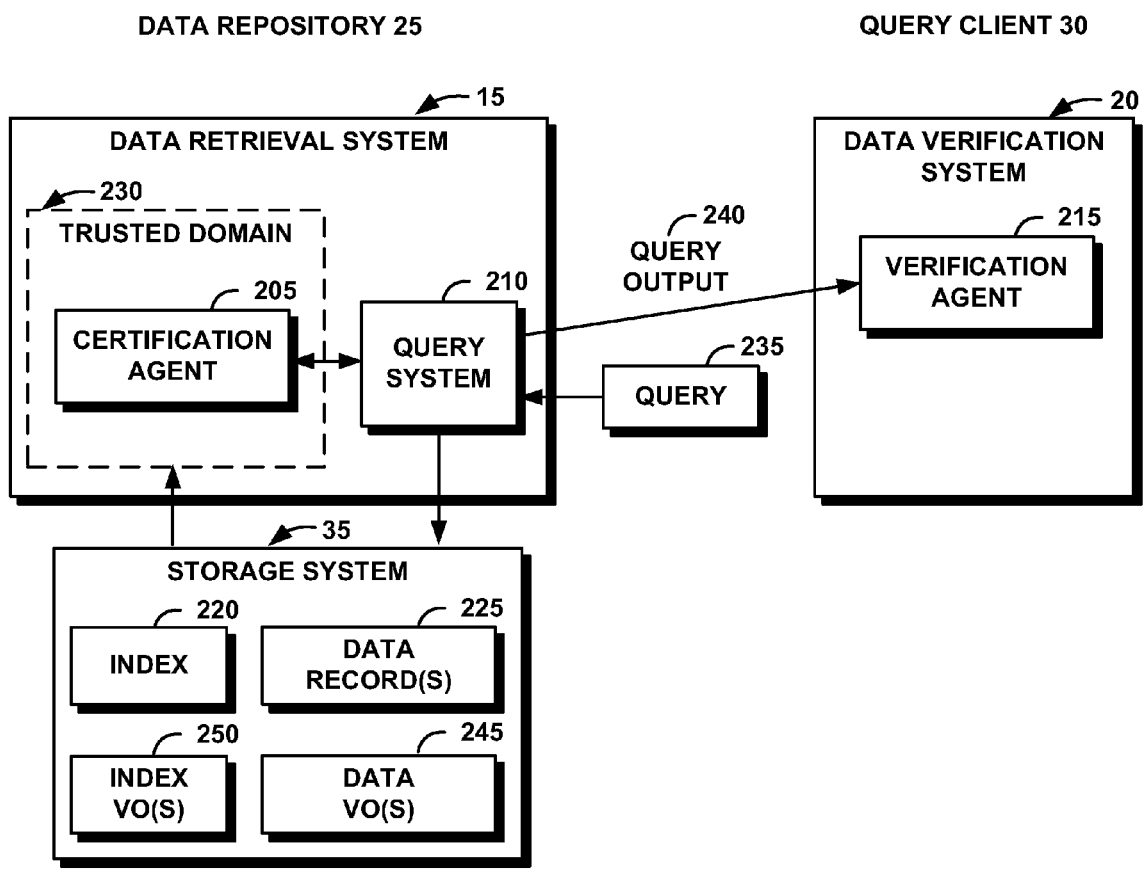
FIG. 2 is a block diagram of the high-level architecture of the data retrieval and verification system of FIG. 1 illustrating a data repository which comprises a certification agent in a trusted domain, a query system and a storage system, and a query client which comprises a data verification system.

FIG. 2 illustrates a high-level hierarchy of system 10 illustrated as the data retrieval system 15 and the data verification system 20. The data retrieval system 15 comprises a certification agent 205 and a query system 210. FIG. 2 also shows the data verification system 20 comprising a component designated as a verification agent 215.

The storage system 35 comprises an index 220 and data record(s) 225. The index 220 may be any metadata structure suitable for use as an index. Portions of the index or metadata structure may be referred to herein as metadata pages or index segments.

The certification agent 205 comprises a private key and a public key and logic for generating cryptographic signatures. The private key of the certification agent 205 is kept secret while the public key is published and well known. The certification agent 205 resides inside a trusted domain 230, which is tamper-resistant subsystem of the data repository system 25.

The scope of the trusted domain 230 depends on the trustworthiness requirement. In one embodiment illustrated by FIG. 2, the trusted domain 230 comprises the certification agent 205 but not the storage system 35 or the logic of managing data. In another embodiment, the trusted domain 230 may contain other components of the data repository 25 such as the storage system 35. In general, the smaller the trusted domain 230 and the fewer functions the trusted domain 230 provides, the more tamper-resistant the trusted domain 230 can be made. For example, the trusted domain 230 that comprises only the certification agent 205 can be implemented using specially designed tamper-proof hardware such as, for example, a secure co-processor that typically comprises a processor and some secure memory storage.

Secure co-processors are highly secure since they are sealed and protected with mechanisms such that any attempts to penetrate or tamper with the secure co-processor results in erasure of all critical memory. However, due to the additional hardware mechanisms that are needed to defeat tampering and cost concerns, secure co-processors are normally equipped with limited resources and therefore are not suitable for a trusted domain that comprises a large storage subsystem and complicated data management software programs.

The query system 210 receives a query 235 from the query client 30. The query system 210 executes query 235, using the index 220 to retrieve one or more data records in the data records 225 that satisfies query 235. The query system 210 identifies index segments in the index 220 that are used while executing query 235. The query system 210 retrieves the identified index segments. The query system 210 requests the certification agent 205 to provide index verification objects for the identified index segments of the index 220 and data verification objects for the retrieved data records of the data records 225. The query system 210 returns to the verification agent 215 a query output 240 comprising the retrieved data records, the data verification objects, the identified index segments, the generated index verification objects, and the query 235.

The verification agent 215 executes the query specified in the query output 240 using an equivalent query logic, verifying the completeness of the migrated data records by verifying identified index segments with the index verification objects. The verification agent 215 verifies the integrity of each of the data objects in the query result by verifying the retrieved data records with corresponding data verification objects. Verifying the completeness of the query result and the integrity of each of the data objects in the query result verifies the correctness of the migrated data records.

Figure 3:
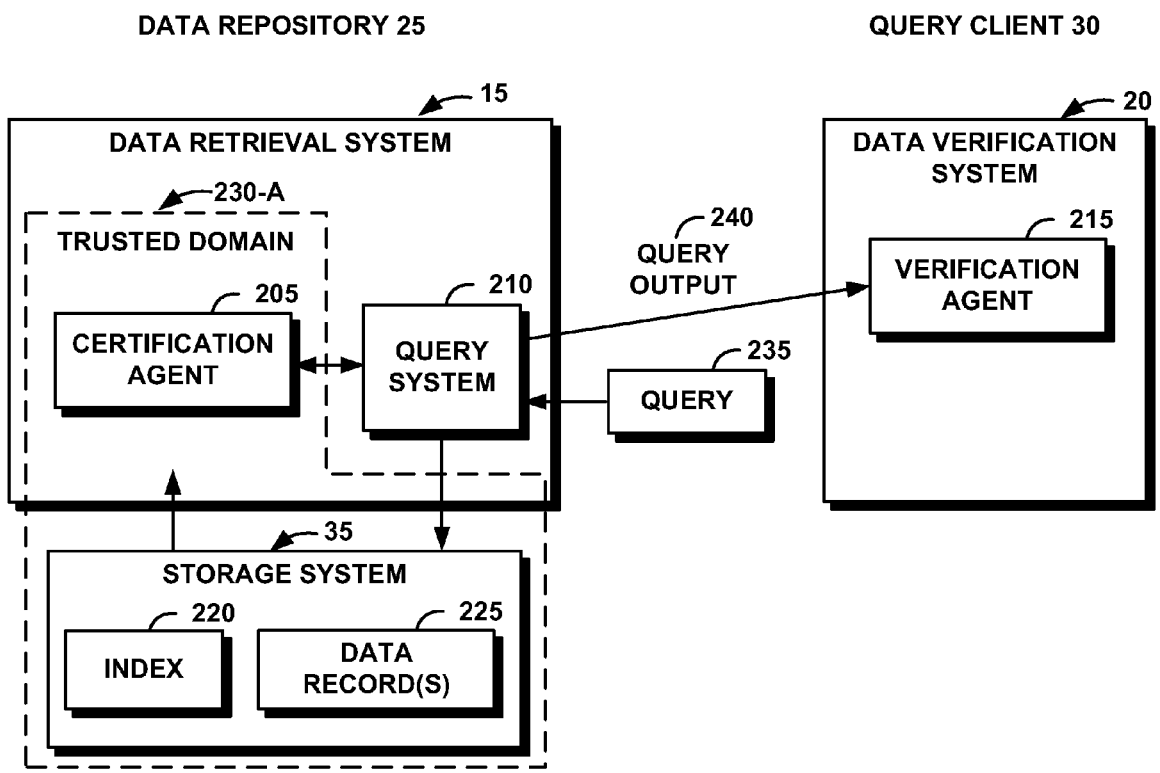
FIG. 3 is a block diagram of the high-level architecture of the data retrieval and verification system of FIG. 1 in which a trusted domain comprises the certification agent, and a storage system.

FIG. 3 illustrates one embodiment in which a trusted domain 230-A comprises the certification agent 205 and the storage system 35. Such a trusted domain may be, for example, a regulatory compliant WORM storage system designed with mechanisms to prevent data from being overwritten. Such a WORM storage system can be augmented to include a certification agent. The trusted domain 230-A comprising the storage system 35 as illustrated by FIG. 3 typically comprises protection mechanisms that are less secure than that of a trusted domain that can be implemented with a secure co-processor (such as one which comprises only the certification agent, as illustrated in FIG. 2).

Referring again to FIG. 2, the certification agent 205 generates a data verification object for each data object as the data object is ingested into the storage system 35. The data verification object is stored in the storage system 35, as indicated by data verification object(s) (VO(s)) 245. The certification agent 205 further generates an index verification object for each index segment in the index 220. The index verification object is shown stored in the storage system 35 as index verification object(s) (VO(s)) 250.

The verification agent 215 executes the query specified in the query output, verifying the completeness of the query result by verifying identified index segments with the retrieved index verification objects. The verification agent 215 verifies the integrity of each of the migrated data objects by verifying the retrieved data records with corresponding retrieved data verification objects. Verifying the completeness of the query result and the integrity of each of the data records in the query result verifies the correctness of the query result.

In the embodiment illustrated by FIG. 2, the data repository 25 computes a secure one-way hash based on the content of the data record when a new data record is inserted into the storage system 35. The hashing can be performed either inside or outside the trusted domain 230 depending on the security requirements. For example, the goal of regulatory compliant systems is to protect against tampering of existing data records, and it is often easier for an insider adversary to deposit an altered data record than to tamper with the data record immediately after insertion. Therefore, in a regulatory compliant environment, the part of the data repository 25 that is outside the trusted domain 230 can often be used to compute the content hash during a data record insertion. Because the trusted domain often has limited resources, hashing the data objects outside the trusted domain reduces the workload of the trusted domain and can improve overall system performance.

System 25 sends the hash to the certification agent 205. The certification agent 205 signs the hash along with a timestamp issued by the certification agent 205, using the secret private key. The signature produced is the data verification object 245 of the inserted data object. The data verification object 245 is stored in the storage system 35 and is migrated with the data record 225 during a data migration. Given the data verification object of a data record, the verification agent 215 can verify whether the data record was created on the system 25 at the time specified by the timestamp and whether the content of the data record has been altered.

To verify the integrity of a data record given its data verification object, all the verification agent 215 requires is the public key of the certification agent 205. The public key of the certification agent 205 is readily available since public key of the certification agent 205 is published and well known. Cryptography theories assure that it is practically computational intractable to produce a different data record that matches the same data verification object.

Verifying the completeness of a query result is more difficult. Unlike with data records, an operation on a metadata structure such as index 220 typically only accesses a small subset of the content of the metadata structure. In addition, a metadata structure is frequently updated while fixed-content data records are not updated once they are created. System 10 is efficient in that system 10 only accesses a subset of the metadata structure. Moreover, system 10 is universal in that system 10 is independent of the logic used to construct and query the index or the metadata structures.

Completeness verification in system 10 is based on the following observation: consider a query logic whose execution comprises a number of steps for a given input, each step accessing a number of segments in the corresponding metadata structure. System 10 denotes such segments as metadata pages. Given that the logic is deterministic, the addresses of metadata pages accessed in step N can be represented as a function of all metadata pages accessed during the previous steps. As long as system 10 can prove that all the pages accessed during the previous N−1 steps have not been altered, system 10 can be sure that system 10 knows exactly which metadata pages are accessed in step N. If system 10 can verify that the contents of these pages are intact, then again system 10 knows confidently where to look for the metadata pages that are needed for step N+1. The process is then repeated until the end of the query execution. By induction in this way, for any given query, system 10 need only to verify the exact subset of the metadata structure that is accessed during the query execution. Consequently, system 10 is much more efficient than a system that verifies the whole index for each query.

Figure 4:
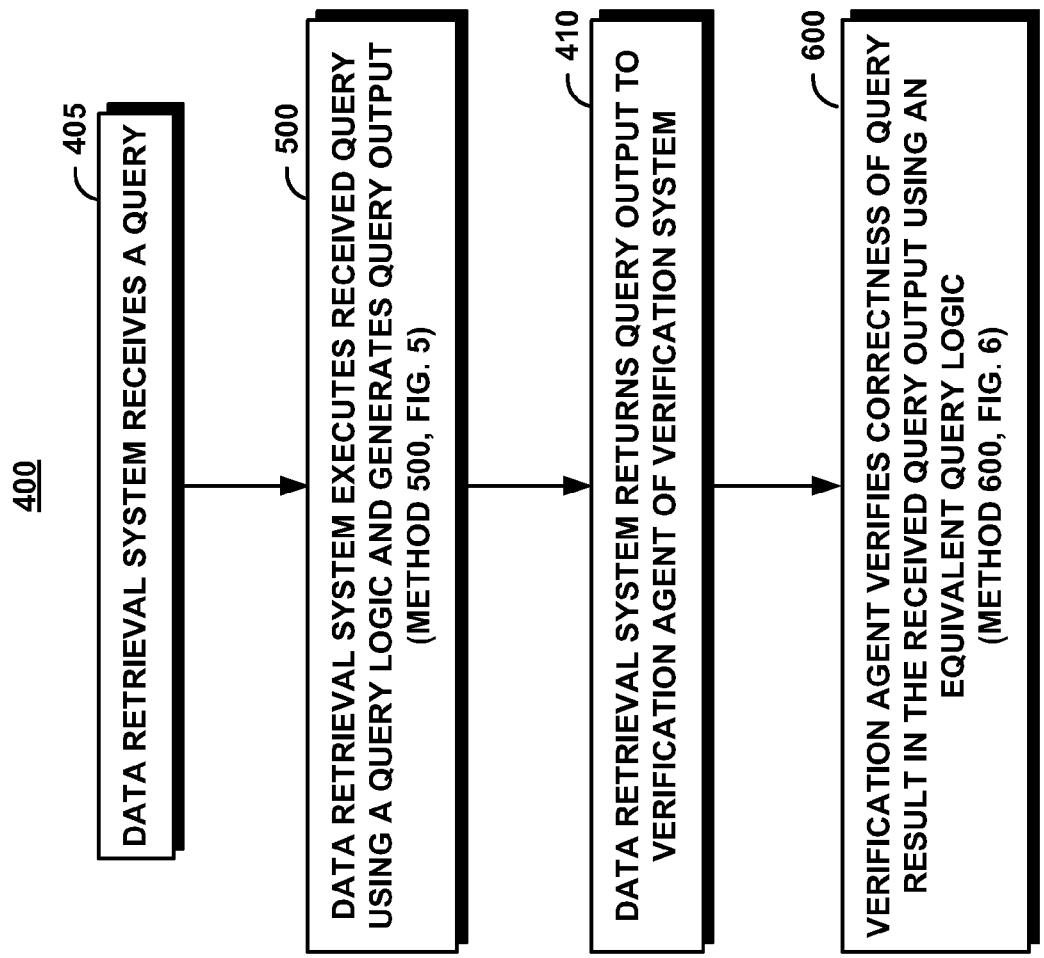
FIG. 4 is a process flow chart illustrating a method of operation of the data retrieval and verification system of FIGS. 1 and 2 in producing query outputs and verify the correctness of query results.

FIG. 4 illustrates a method 400 of system 10 in verifying the correctness the query result 240. The query system 210 receives the query 235 (step 505). The query system 210 executes the received query 235 using a query logic to generate the query output 240 (step 500, further illustrated in method 500 of FIG. 5). The query system 210 returns the query output 240 to the data verification system 20 (step 410). The verification agent 215 in system 20 verifies the correctness of the query result in the query output 240 using an equivalent query logic with the query and the verification information included in the query output 240 (step 600, further illustrated in method 600 of FIG. 6).

Figure 5:
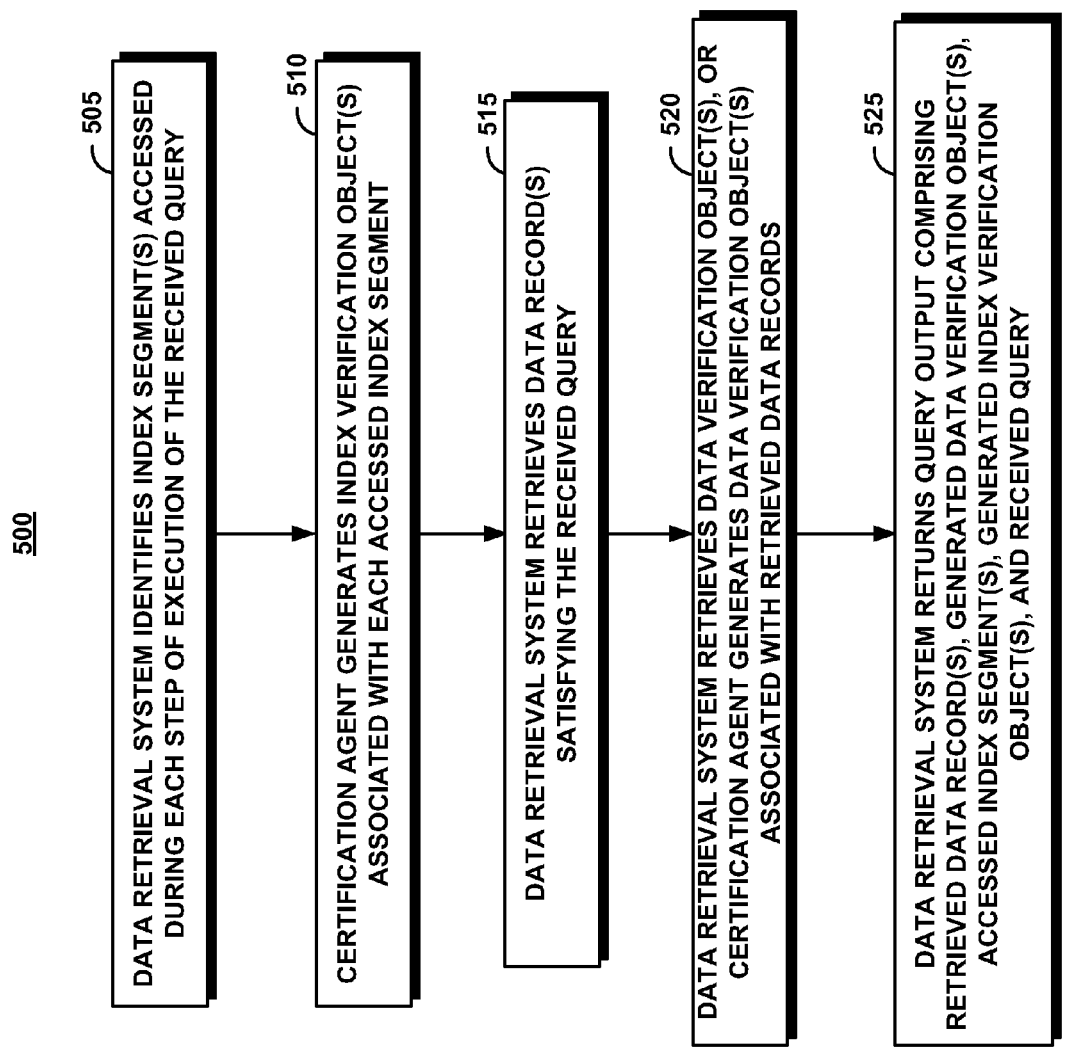
FIG. 5 is a process flow chart illustrating a method of operation of the search system of the data retrieval and verification system of FIGS. 1 and 2 in executing a query to generate a query output to return to a query client.

FIG. 5 illustrates a method 500 of system 15 in executing a query to generate the query output 240. The query system 210 identifies one or more index segments of the index 220 accessed during each step of the execution of the received query 235 (step 505). The certification agent 205 generates one or more index verification objects associated with each accessed index segment of the index 220 (step 510). From the data records 225, the query system 210 retrieves the data records satisfying the received query 235 (step 515) and the associated data verification objects generated by the certification agent 205. The query system 210 returns the query output 240 to the data verification system 20. The query result 240 comprises the retrieved data records (query result), the data verification objects for the retrieved data records, the accessed index segments, the index verification objects for the accessed index segments, and the received query 235 (step 525).

In one embodiment, the certification agent 205 generates one index verification object for each metadata page or index segment in the metadata structure to construct the index verification objects. The generated index verification object compromises secure one-way hashes of the content of the index page and a timestamp, signed by the certification agent 205. The generated index verification object also comprises the relative location of the corresponding metadata page in the metadata structure to detect replacement of one metadata page or index segment with another metadata page or index segment that has a valid index verification object.

To verify a query result, the following are used by the verification agent 215: the query output 240, a query logic which is equivalent to the one used by the query system 210, and the public key of the certification agent 215 that generated the index verification objects and the data verification objects. The query result 240 comprises the retrieved data records, the data verification objects corresponding to the retrieved data records, the accessed index segments or metadata structures, the generated index verification objects for the accessed index segments or metadata structures, and the query 235. During the verification process, the verification agent 215 follows the equivalent query logic used to repeat the execution of the query 235 over the provided index segments or metadata pages, verifying the integrity of each index segment or metadata page using the associated index verification object. The verification process returns an error if a different result is reached than the provided query result in the query output 240.

The verification agent 215 can use several approaches to obtain an equivalent query logic used by the query system 210. In one embodiment, the query system 210 publishes the algorithms used by the query logic for the metadata structures, which allows the query client 30 to implement an equivalent query logic, or obtain one from a third-party vendor. In another embodiment, the algorithms used by the query logic in the query system 210 are not published, but the vendor of the data retrieval system 15 also makes available a data verification system 20 that uses an equivalent query logic. In yet another embodiment, instead of providing the data verification system directly, a vendor can offer a data verification service to the query client 30. Such a data verification service takes as input the query result 240 and the public key of the certification agent 205 and returns a verification result indicating whether the query result 240 meets the correctness requirement.

Figure 6B:
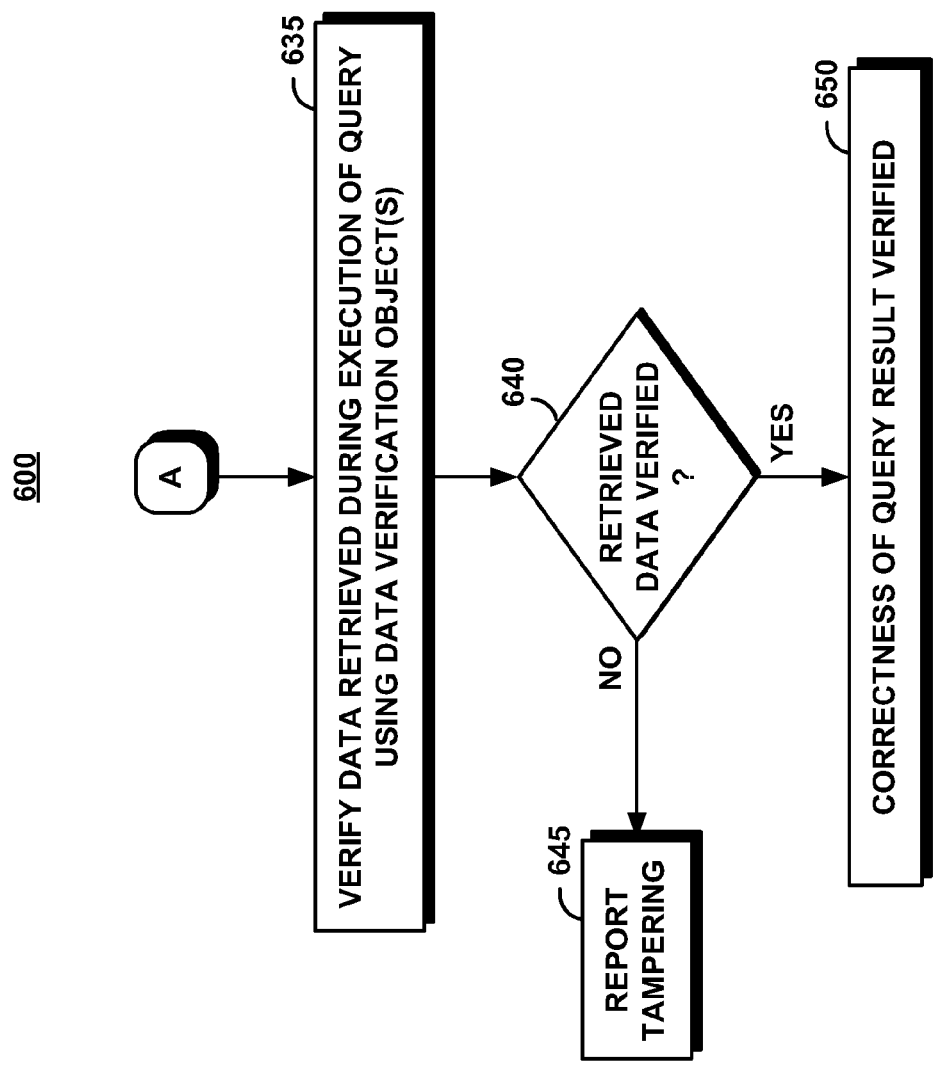
FIG. 6 is comprised of FIGS. 6A and 6B, and represents a process flow chart illustrating a method of operation of the verification agent of the data retrieval and verification system of FIGS. 1, 2, and 3 in verifying the correctness of the query results.

FIG. 6 (FIGS. 6A and 6B) illustrates a method 600 of system 10 in verifying the correctness of query results. The verification agent 215 selects an initial query step in the execution of the query 235 included in the query output 240 returned in step 410 of method 400, FIG. 4 (step 605). The verification agent 215 verifies the index segments accessed during the selected query step using the associated index verification objects included in the query output 240 (step 610). The verification fails if the secure hash of at least one of the index pages accessed does not match the secure hash included in the verification object of the index page. The verification also fails if at least one of the verification objects does not comprise a signed timestamp that is up-to-date. Requiring the verification objects to comprise a signed timestamp prevents replay attacks where an adversary uses stale index data and verification objects in a query result. Requirements for timestamp recency depend on the trustworthiness requirement. The verification also fails if at least one of the index pages required by the query step is not included in the query result. If the index data is not verified (decision step 615), the verification agent 215 reports tampering (step 620).

If the index data is verified (decision step 615), the verification agent 215 determines whether addition query steps remain in the query execution (decision step 625). If yes, the verification agent 215 selects a next query step (step 630) and processing returns to step 610.

If no addition query steps in the query execution remain (decision step 625), the verification agent 215 verifies the list of data records produced by the query execution matches the query result included in the query output 240 and verifies the integrity of the data records using associated data verification objects (step 635). If the retrieved data is not verified (decision step 640), the verification agent 215 reports tampering (step 645). Otherwise, if the retrieved data is verified (decision step 640), the verification agent 215 has verified the correctness of the migrated data by verifying the integrity and completeness of the migrated data (step 650).

The embodiment illustrated by FIG. 3 represents a configuration in which the storage system 35 storing the index 220 and data records 225 is inside the trusted domain and therefore is protected from tampering. In this configuration, the generation of the data verification objects and index verification objects can be delayed to a later time, provided the construction of the data verification objects and the index verification objects occur inside the trusted domain. For example, the verification objects can be generated in an on-demand fashion when data objects are retrieved from the data repository 25 in response to a query. Furthermore, the certification agent 205 and the storage system 35 are protected in the trusted domain 230 and the certification agent is guaranteed to be provided with trustworthy data from the storage system 35. Therefore, the system is not required to store the verification objects on the storage system 35, as the verification objects can always be regenerated by the trusted domain when needed.

The embodiment illustrated in FIG. 2 represents a configuration in which the trusted domain has limited resources and does not comprise the storage system 35. In this configuration, an adversary may tamper the storage system 35 or the communication between the storage system 35 and the certification agent 205 to feed the certification agent 205 incorrect data. To detect such tampering, a data verification object for a data record is generated when the data record is created. Because the data verification object cannot be regenerated by the certification agent 205 at a later time, the data verification object needs to be generated during data record insertion and is stored in storage system 35. Even though storage system 35 is not protected in the trusted domain, it is safe to store the verification objects there because the verification objects are signed using the private key of the certification agent 205 and cannot be forged without access to the private key.

Similarly, in the embodiment illustrated in FIG. 2, the certification agent 205 cannot trust the index stored on storage system 35, which is outside the trusted domain 230. Unlike data records, which are fixed-content, index pages or metadata structure segments are allowed to be updated. A trusted domain with limited resources does not have sufficient room to store a verification object for each index page, yet still needs a way to "remember" the current state of each index page to distinguish between a legitimate update that is append-only and a malicious update that overwrites existing index data. To address this issue, the certification agent 205 uses an authentication data structure, such as, for example, a Merkle tree. A Merkle tree is a tree of hashes. As used by the certification agent 205, the leaves in the Merkle tree are secure hashes of the metadata pages, and nodes further up in the tree are secure hashes of their respective children. Only the root of the Merkle tree needs to be maintained inside the certification agent 205, because any change to the metadata structure will lead to a different value for the root of the Merkle tree. The Merkle tree enables efficient verification of a subset of the metadata structure by using a tree of hashes and one index verification object for the root of the Merkle tree. This embodiment is especially useful when the trusted domain 230 does not have sufficient resources for storing a large number of index verification objects, enabling the trusted domain 230 to manage very large metadata structures.

Unlike the case with a trusted domain 230 in which the index verification objects for metadata pages or index segments can be generated immediately prior to the construction of the query output 240 (as illustrated in FIG. 3), a configuration where the index cannot be stored inside the trusted domain requires maintenance from the creation of the metadata structure or index to verify the legitimacy of each update to the metadata structure or index. Furthermore, when system 25 performs an update to a metadata page or index segment, the certification agent 205 requires sufficient information such that the root of the corresponding Merkle tree can be updated correctly. Assuming that only the root of the Merkle tree is maintained in the trusted domain, the certification agent 205 requires the following information during an update to a metadata page or index segment: previous content of the metadata page, all the nodes along the path from the metadata page to the root of the Merkle tree (or hash values of all the siblings of these nodes, depending on whether these hash values are stored as part of the content of the parent node), and the updated content of the metadata page.

To verify legitimacy of the index page update, the certification agent 205 calculates the root hash of the Merkle tree from the previous content of the metadata page and the nodes along the path from the metadata page to the root. The certification agent 205 then compares the calculated Merkle tree root against the one stored in the trusted domain 230. If the calculated Merkle tree root matches the stored Merkle tree root, the certification agent 205 is assured that the previous content of the index page provided is correct. The certification agent 205 then can verify that the update does not overwrite existing data in the index page. If the update is legitimate, the certification updates the Merkle tree root maintained inside the trusted domain 230 to reflect the change made to the index. In such an embodiment, a complement verification object for an index page includes the following: the Merkle tree root with a timestamp, signed by the certification agent 205 using the secret key of the certification agent 205, and all the nodes along the path from the metadata page to the root of the Merkle tree.

Figure 7:
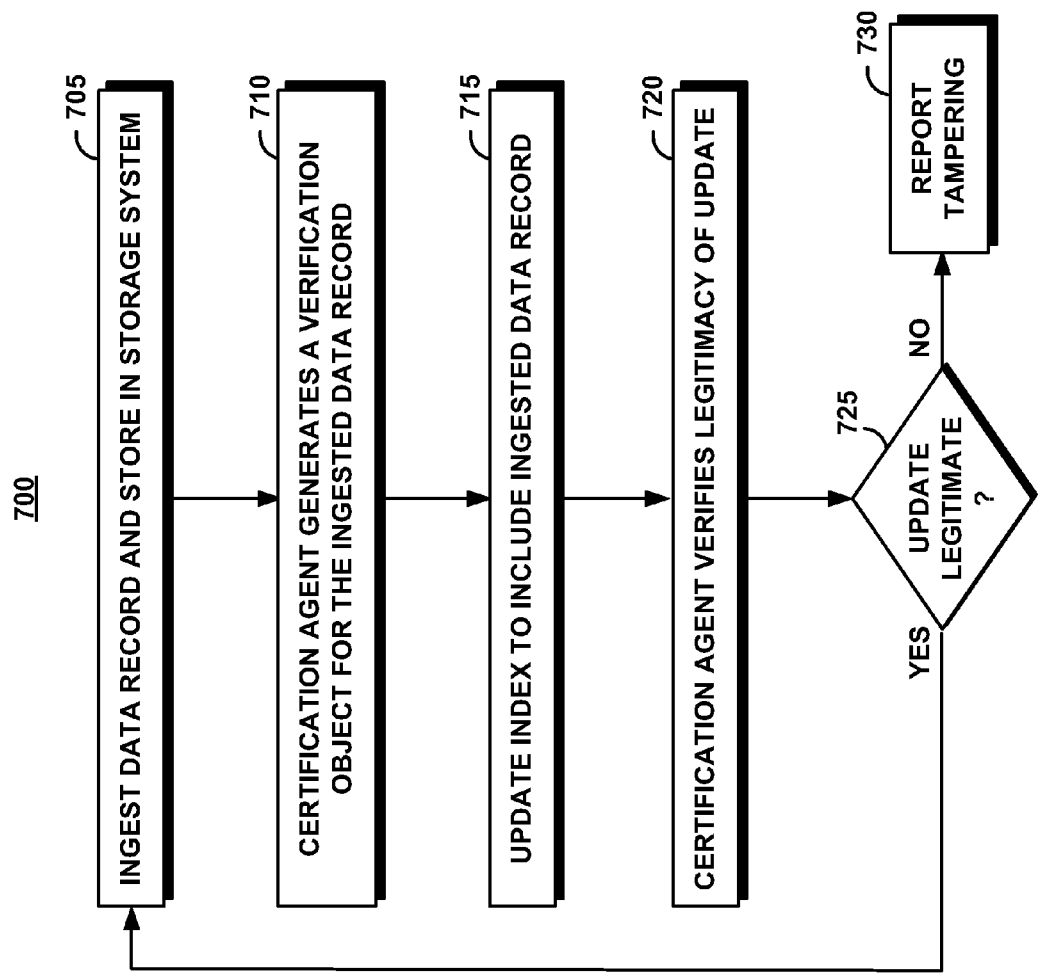
FIG. 7 is a process flow chart illustrating a method of operation of the data retrieval and verification system of FIG. 1 in ingesting data records and updating metadata structures.

FIG. 7 illustrates a method 700 in inserting a data record into the data records 225 for the embodiment illustrated in FIG. 2 in which the index verification objects 250 and the data verification objects 245 are stored in the storage system 15, outside the trusted domain 230. Method 700 also describes insertion of data records into the storage system 35 of the data repository 25.

The data repository 25 ingests a data record and stores the data record in the storage system 35 (step 705). The certification agent 205 generates a data verification object 245 for the ingested data record (step 710). System 25 updates index 220 to include the ingested data record 225 (step 715). The certification agent 205 verifies the legitimacy of the update (step 725). If the update is not legitimate (decision step 730), the certification agent 205 reports tampering (step 735). Otherwise, if the update is legitimate system 25 the certification agent updates the Merkle tree root maintained inside the trusted domain 230 and returns processing to step 705.

Figure 8:
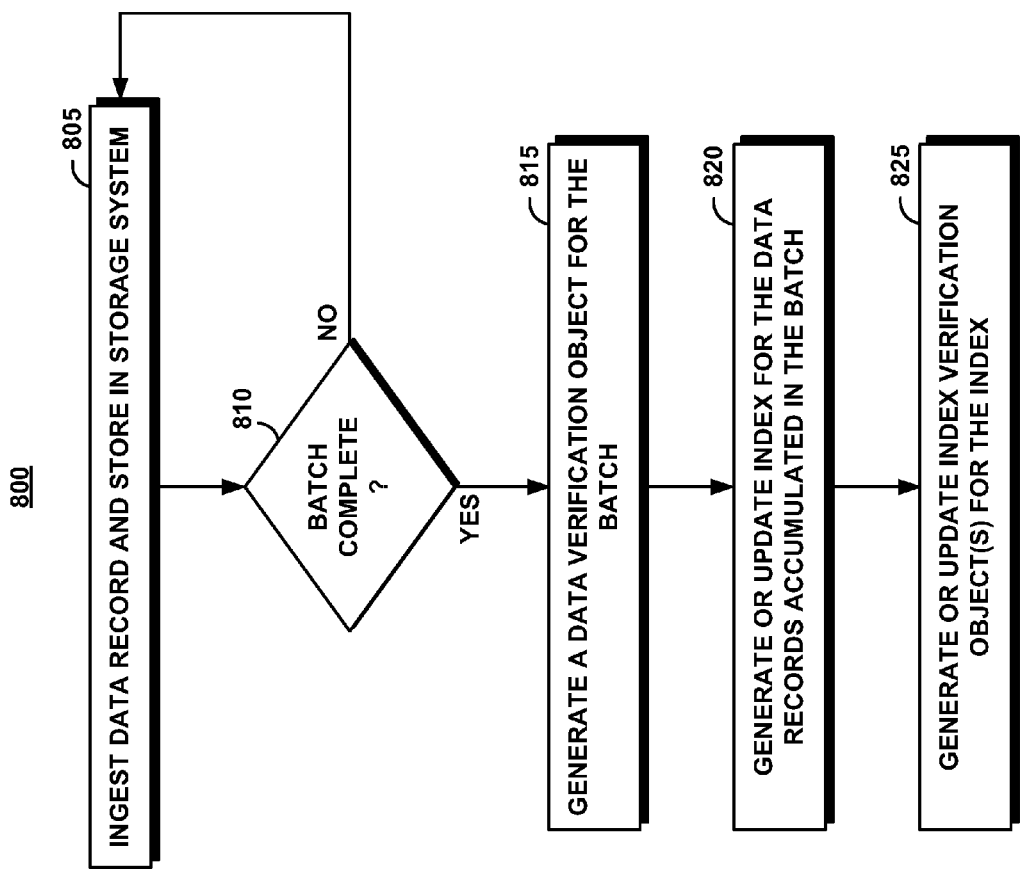
FIG. 8 is a block diagram of the high-level architecture of the data retrieval and verification system of FIG. 1 in which a target data repository contains data migrated from a source data repository.

FIG. 8 illustrates a method 800 in which data records are ingested into the data repository 25 in a batch. The data repository 25 ingests a data record and stores the ingested data record in the storage system 35 (step 805). If the batch is not complete (decision step 810), the data repository 25 continues to ingest data records (step 805) until the batch is complete.

The certification agent 205 generates a data verification object 245 for the batch (step 815). The data repository 25 generates an index for the ingested data records accumulated in the batch, or updates an existing index to include the ingested data records (step 820). The certification agent 205 generates an index verification object 250 for the index, or updates one or more existing index verification objects (step 825).

Figure 9:
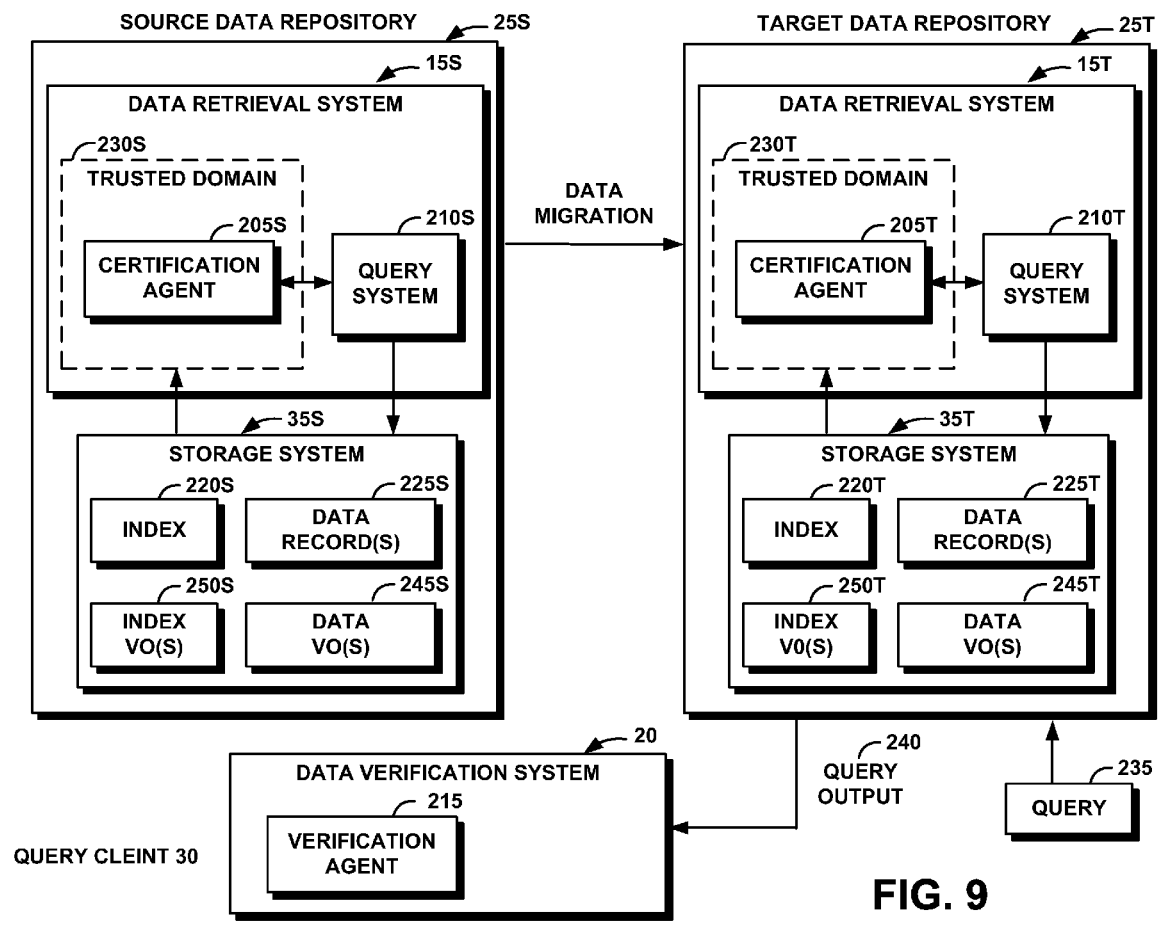
FIG. 9 is a process flow chart illustrating a method of operation of the data retrieval and verification system of FIGS. 1 and 2 in ingesting data records in a batch.

FIG. 9 illustrates an embodiment of the present invention where the correctness of query results can be verified for data migrated from a source data repository 25S to a target data repository 25T. The source data repository comprises a source data retrieval system 15S and a source storage system 35S. The target data repository comprises a target data retrieval system 15T and a target storage system 35T. For the purpose of illustration only, only a subset of all components of system 25S and 25T is shown in FIG. 4. In addition, the system 25S and system 25T are similar in functionality, but not necessarily similar in composition. Furthermore, for the purpose of illustration only, FIG. 4 shows that the source trusted domain 230S in system 25S includes the source certification agent 205S but not the source storage system 35S, and the target trusted domain 230T in system 25T includes the target certification agent 205T but not the target storage system 35T. In another embodiment, the source trusted domain 230S may include the source storage system 35S and the target trusted domain 230T may include the target storage system 35T. The general idea of the method of this invention applies to both embodiments.

During a data migration from the source data repository 25S to the target data repository 25T, a subset or all of the data records 225S is transferred to the target data repository 25T. Similarly, a subset or all of the indexes 220S is transferred to the target data repository 25T. For each data record transferred from system 25S to system 25T, the verification object of the data record is also transferred to the target system 25T. Similarly, for each index transferred from system 25S to system 25T, the verification object of the index is also transferred to the target system 25T. Transferring the verification object of an index could mean transferring the verification object of every index page in the index, or it could mean transferring a root verification object of the index in the case where the source data retrieval system 20S utilizes some authentication data structures (such as a Merkle tree) for generating verification objects for indexes. After the data migration, the target storage system 15T in system 25T stores the following: data records migrated from the source data repository 25S and the associated data verification objects generated by the source certification agent 205S; indexes migrated from the source data repository 25S and the associated index verification objects generated by the source certification agent 205S. In addition, the target storage system 15T may also contain data records and indexes that are not migrated from system 25S, and the associated data verification objects and index verification objects generated by the target certification agent 205T.

For fixed-content data records that are migrated from system 25S to system 25T, no additional data verification objects need to be generated by the target certification agent 205T because the data verification objects generated for these data records by the source certification agent 220S are adequate to prove the integrity of these data records. For indexes migrated from system 25S to system 25T, the target certification agent 220T may need to generate additional verification information. Such additional verification information proves that these indexes were indeed migrated to the target system 25T at the time of the migration. For example, in one embodiment where the associated index verification object of a migrated index is a signed Merkle tree root generated by the source certification agent 205S, the additional verification information can be produced by having the target certification agent 205T sign the index verification object of the index (which was generated by the source certification agent 205S) along with a timestamp indicating the time of the data migration, using the private key of the target certification agent 205T. The additional index verification information prevents an adversary from including a different version of index pages and index verification objects from source system 25S which are not migrated to the target system 25T, in a query output in response to a query received by the target system 25T.

When the target system 25T receives a query and the query execution accesses data records or indexes migrated from the source system 25S, the target system 25T produces a query output which comprises the following: the query result comprising data records meeting the query criteria; data verification objects associated with the data records; index pages accessed during the query execution and index verification objects; and the additional index verification information associated with the migrated index pages which is generated by the target certification agent 205T during the data migration. The verification agent 215 uses the migrated data verification objects to verify the integrity of the migrated data records in the query result, and uses the index pages, the index verification objects and the additional index verification information to verify the completeness of the query results.

The method for verifying the correctness of query results containing migrated data also applies to the cases where data records and indexes are migrated multiple times (for example, for system A to system B then to system C), data migration from one source system to multiple target systems, and data migration from multiple source system to one target system, and data migration from multiple source systems to multiple target systems.

It is to be understood that the specific embodiments of the invention that have been described are merely illustrative of certain applications of the principle of the present invention. Numerous modifications may be made to system and method for verifying the integrity and completeness of records described herein without departing from the spirit and scope of the present invention.

What is claimed is:

1. A processor-implemented method for verifying the integrity and completeness of query results, comprising:

receiving a data record in computer random access memory, and ingesting a data record in a data repository and entering the data record into a storage system comprising an index including index segments;

computing a secure one-way hash within the data repository and outside of a trusted domain for the data record based on data record content;

sending the hash to a certification agent comprising a secret private key, a public key and a logic for generating cryptographic signatures within the trusted domain;

requesting the certification agent to sign the hash along with a timestamp using the secret private key to create a data verification object for the data record;

requesting the certification agent to generate index verification objects for index segments in the index, wherein the index verification objects comprise a secure one-way hash of an index page and a timestamp signed by the certification agent;

receiving a query from a query client including a verification agent;

executing the query using the index to search for the data record satisfying the query;

retrieving the data record satisfying the received query and the associated data verification objects generated by the certification agent;

identifying and retrieving index segments and their index verification objects associated with the data record satisfying the query during the execution of the query;

transmitting to a verification agent a query output comprising the retrieved data records, the data verification objects, the identified indexed segments, the generated index verification objects and the query;

executing the query in the query output and retrieving the data record satisfying the query;

verifying whether the data record was created at a time specified by the timestamp;

verifying the completeness of the query result by verifying the identified index segments with the retrieved index verification objects;

identifying migrated data and verifying the correctness and completeness of the migrated data by requiring additional verification including a signed Merkle tree root;

verifying the integrity of data objects by verifying the retrieved data records with corresponding retrieved data verification objects in the verification agent by referencing a public key of the certification agent; and implementing batch processing for batches of data records comprising:

ingesting data records in a batch and continuing to ingest records until the batch is complete;

generating a data verification object for the batch;

generating an index for ingested data records accumulated in the batch; and generating an index verification object for the index for ingested data records accumulated in the batch.

2. A computer program product comprising a computer storage medium having a plurality of executable instruction codes, for verifying the correctness of query results, comprising:

a set of instruction codes in the computer storage medium, for receiving a query at a data repository; the data repository comprising a data retrieval system for executing the received query, wherein the data retrieval system comprises a query system and a trusted domain, wherein the trusted domain is a tamper-resistant secure sub-system, the trusted domain further comprises a storage system and a certification agent for providing verification information for retrieved data records, wherein:

the storage system comprises index segments and data records, and the index segments comprise a metadata structure;

a set of instructions for generating cryptographic signatures for use by the certification agent including a private key and a public key;

a set of instruction codes for executing the received query using a query logic;

a set of instruction codes for producing a query output when the cryptographic signatures are verified by the certification agent that includes a query result and the verification information associated with the query result, wherein the query result includes the received query and data records that satisfy the received query including data verification objects associated with the data records and, wherein the query result further includes index verification objects including index pages associated with the index segments and the received query, wherein the index verification objects comprise a secure one-way hash of one of the index pages and a timestamp signed by the certification agent;

a set of instruction codes for transferring the query output to a verification system;

a set of instruction codes for verifying the integrity and completeness of the query result using the verification information included in the query output;

a set of instruction codes for verifying the integrity and completeness of the query result by executing an equivalent query logic on the query specified in the query output;

a set of instruction codes for identifying migrated data and verifying the correctness and completeness of the migrated data by requiring additional verification including a signed Merkle tree root; and a set of instruction codes for generating Merkle tree authentication data structures for generating data verification objects to verify the integrity of the data records in the query result, by means of the index pages and the associated index verification objects to verify the completeness of the query result; and a set of instruction codes for implementing batch processing for batches of data records comprising:

ingesting data records in a batch and continuing to ingest records until the batch is complete;

generating a data verification object for the batch;

generating an index for ingested data records accumulated in the batch; and generating an index verification object for the index for ingested data records accumulated in the batch.

3. A processor-implemented system for verifying the correctness of query results, comprising:

a data repository including a computer;

a query client system for receiving a query and retrieving data records from the data repository by sending data requests to the data repository, including receiving batches of the data records;

a storage system for including an index of metadata structures including index segments for ingesting data objects and housing the data records and index segments in the data repository;

a data retrieval system for executing the query received from the query client system to retrieve the data records from the storage system, the data retrieval system further including a certification agent residing in a trusted domain, the trusted domain serving as a tamper-resistant subsystem of the data repository, the certification agent comprising a secret private key, a published public key, and a logic for generating cryptographic signatures, the data retrieval system employing the certification agent for generating a data verification object for respective data objects ingested in the storage system and an index verification object for each index segment, wherein the index verification object comprises a secure one-way hash of one of the index segments and a timestamp signed by the certification agent, and the location of one of the index segments within the index verification object;

the query client system for retrieving the data records retrieved by the data retrieval system and identifying index segments associated with the data records;

the query client system for producing a query output that includes the received query, a query result and verification information associated with the query result wherein the query result includes the data records, the data verification objects, and the index verification objects that satisfy the received query;

a data verification system including a verification agent for receiving the query output and verifying the integrity and completeness of the query result by employing the certification agent to verify the data records produced by the query execution match the query result included in the query output and verify the integrity of the data records using the data verification objects including the secret private key and the published public key and the index verification objects, and employing the certification agent to verify batches of objects, and identifying migrated data and verifying the correctness and completeness of the migrated data by requiring additional verification including a signed Merkle tree root.

* * * * *